US010783031B2

(12) United States Patent
Payet et al.

(10) Patent No.: US 10,783,031 B2
(45) Date of Patent: Sep. 22, 2020

(54) IDENTIFYING READ-SET INFORMATION BASED ON AN ENCODING OF REPLACEABLE-INFORMATION VALUES

(71) Applicant: Arm Limited, Cambridge (GB)

(72) Inventors: Damien Guillaume Pierre Payet, Antibes (FR); Lucas Garcia, Antibes (FR); Natalya Bondarenko, Antibes (FR); Stefano Ghiggini, Antibes (FR)

(73) Assignee: Arm Limited, Cambridge (GB)

( * ) Notice: Subject to any disclaimer, the term of this patent is extended or adjusted under 35 U.S.C. 154(b) by 68 days.

(21) Appl. No.: 16/105,129

(22) Filed: Aug. 20, 2018

(65) Prior Publication Data

US 2020/0057692 A1 Feb. 20, 2020

(51) Int. Cl.
*G06F 11/00* (2006.01)
*G06F 11/10* (2006.01)
(52) U.S. Cl.
CPC ...... *G06F 11/1016* (2013.01); *G06F 11/1064* (2013.01)
(58) Field of Classification Search
None
See application file for complete search history.

(56) References Cited

U.S. PATENT DOCUMENTS

| 9,965,320 B2* | 5/2018 | Kassa | G06F 9/467 |
| 2017/0109168 A1* | 4/2017 | Ayub | G06F 12/0891 |
| 2017/0269960 A1* | 9/2017 | Diestelhorst | G06F 9/3842 |
| 2019/0258489 A1* | 8/2019 | Horsnell | G06F 9/30036 |
| 2019/0347124 A1* | 11/2019 | Payet | G06F 12/0893 |

OTHER PUBLICATIONS

H. Q. Le et al., "Transactional memory support in the IBM Power8 processor," in IBM Journal of Research and Development, vol. 59, No. 1, pp. 8:1-8:14, Jan.-Feb. 2015, (Year: 2015).*

* cited by examiner

*Primary Examiner* — Daniel F. McMahon
(74) *Attorney, Agent, or Firm* — Nixon & Vanderhye P.C.

(57) ABSTRACT

An apparatus comprises processing circuitry, transactional memory support circuitry and a cache. The processing circuitry processes threads of data processing, and the transactional memory support circuitry supports execution of a transaction within a thread, including tracking a read set of addresses, comprising addresses accessed by read instructions within the transaction. A transaction comprises instructions for which the processing circuitry is configured to prevent commitment of the results of speculatively executed instruction until the transaction has completed. The cache has a plurality of entries, each associated with an address and specifying a replaceable-information value for that address that comprises information for which, outside of the transaction, processing would be functionally correct even if the information was incorrect. While the transaction is pending, the transactional memory support circuitry identifies, based on an encoding of the replaceable-information values, read-set information identifying addresses in the read set tracked for the transaction.

19 Claims, 11 Drawing Sheets

40 — lock [#addLock] ⟶ read lock, spin if already locked, claim lock if unlocked
LD [#add1]
ADD
MUL
STR [#add2]
LD [#add3]
.
.
.
42 — unlock [#add Lock] ⟶ release lock

US 10,783,031 B2

IDENTIFYING READ-SET INFORMATION BASED ON AN ENCODING OF REPLACEABLE-INFORMATION VALUES

BACKGROUND

Technical Field

The present technique relates to the field of data processing. More particularly, it relates to transactional memory.

Technical Background

A data processing system may execute a number of threads of data processing. Sometimes, the threads may need to access a shared resource and the nature of the data processing operations may be such that once a thread starts interacting with the shared resource, it may be necessary for a set of operations to complete atomically using the resource without another thread accessing the resource in the meantime.

One technique for handling this conflict between threads may be to use locks to control excessive access to at least one target resource. For example, when one thread starts accessing data in a particular address region, the thread may set a lock variable to claim ownership of the lock, and then while the lock owning thread has ownership of the lock, other threads checking the lock variable may determine that the lock is already claimed and so may not enter the section of code which interacts with that address region. Such a lock-based approach can be seen as pessimistic in that each thread by default assumes that it cannot enter the section of code which accesses the shared resource because a conflict with another thread may occur, unless it has ownership of the lock guaranteeing that no conflict can occur. However, often a lock identifier may control exclusive access to a number of resources (e.g. a range of addresses), and so it is not guaranteed that if one thread is accessing certain resources within the set of resources protected by the lock variable, another thread will definitely access the same resource. Hence, a lock-based approach may, in cases where conflicts between threads are rare, lead to a loss of performance because threads may unnecessarily be waiting for the locks to be released before entering the critical section of code which uses the shared resource.

A more optimistic approach for handling conflict between threads accessing shared resources can be to use transactional memory support. A data processing system may have circuitry to support execution of a transaction within a thread of data processing by the processing circuitry. The transaction may be those instructions of the thread which are executed between a transaction start instruction marking the beginning of the transaction and a transaction end instruction marking the end of the transaction. Between the transaction start and end instructions, the processing circuitry may speculatively execute the intervening instructions and prevent commitment of the results of those speculatively executed instructions until the transaction end instruction is reached. Occurrence of an abort event following execution of the transaction start instruction (but before the transaction end instruction is reached) may result in the transaction being aborted and the speculative results being discarded. There may be a number of reasons for aborting a transaction, but one reason may be a detected conflict with a memory access made by another thread.

Hence, with this approach each thread may optimistically start processing the critical section of code assuming that no conflicts with other threads occur, and then if the end of the critical section is reached without any conflict being detected the results of the transaction can be committed. In cases where conflict is rare, using transactional memory support can improve performance by allowing more threads to concurrently process their critical sections of code.

SUMMARY

At least some examples provide an apparatus comprising: processing circuitry to process threads of data processing; transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, in which the transactional memory support circuitry is configured to trigger an abort of the transaction in response to detecting a write access from another thread to one of a read set of addresses tracked for the transaction; and a cache having a plurality of entries, each entry associated with one of a plurality of addresses and specifying a replaceable-information value associated with that address, the replaceable-information value comprising information for which outside of the transaction processing would be functionally correct even if the information was incorrect;

in which, while the transaction is pending, the transactional memory support circuitry is configured to identify, based on an encoding of the replaceable-information values, read-set information identifying addresses in the read set of addresses tracked for the transaction.

At least some examples provide a data processing method comprising: identifying, in a cache having a plurality of entries, each entry associated with one of a plurality of addresses, a replaceable-information value for each address, in which the replaceable-information value comprises information for which outside of the transaction processing would be functionally correct even if the information was incorrect; while a transaction is pending, identifying, based on an encoding of the replaceable-information values, read-set information identifying addresses in a read set of addresses tracked for the transaction; in which the transaction comprises instructions of a thread executed speculatively between a transaction start instruction and a transaction end instruction, for which commitment of results of the speculatively executed instructions is prevented until the transaction end instruction is reached, and an abort of the transaction is triggered in response to detection of a write access from another thread to one of the read set of addresses tracked for the transaction.

At least some examples provide an apparatus comprising: means for processing threads of data processing; means for supporting execution of a transaction within a thread processed by the means for processing, the transaction comprising instructions of the thread executed speculatively between a transaction start instruction and a transaction end instruction, for which the means for processing is configured to prevent commitment of results of the speculatively executed instructions until the transaction end instruction is reached, in which the means for supporting is configured to trigger an abort of the transaction in response to detecting a write access from another thread to one of a read set of addresses tracked for the transaction; and a means for caching data, comprising a plurality of entries, each entry associated with one of a plurality of addresses and specifying a replaceable-information value associated with that address, the replaceable-information value comprising information for which outside of the transaction processing would be functionally correct even if the information was incorrect; in which, while the transaction is pending, the means for supporting is configured to identify, based on an encoding of the replaceable-information values, read-set information identifying addresses in the read set of addresses tracked for the transaction.

Further aspects, features and advantages of the present technique will be apparent from the following description of examples, which is to be read in conjunction with the accompanying drawings.

DESCRIPTION OF EXAMPLES

Figure 1:
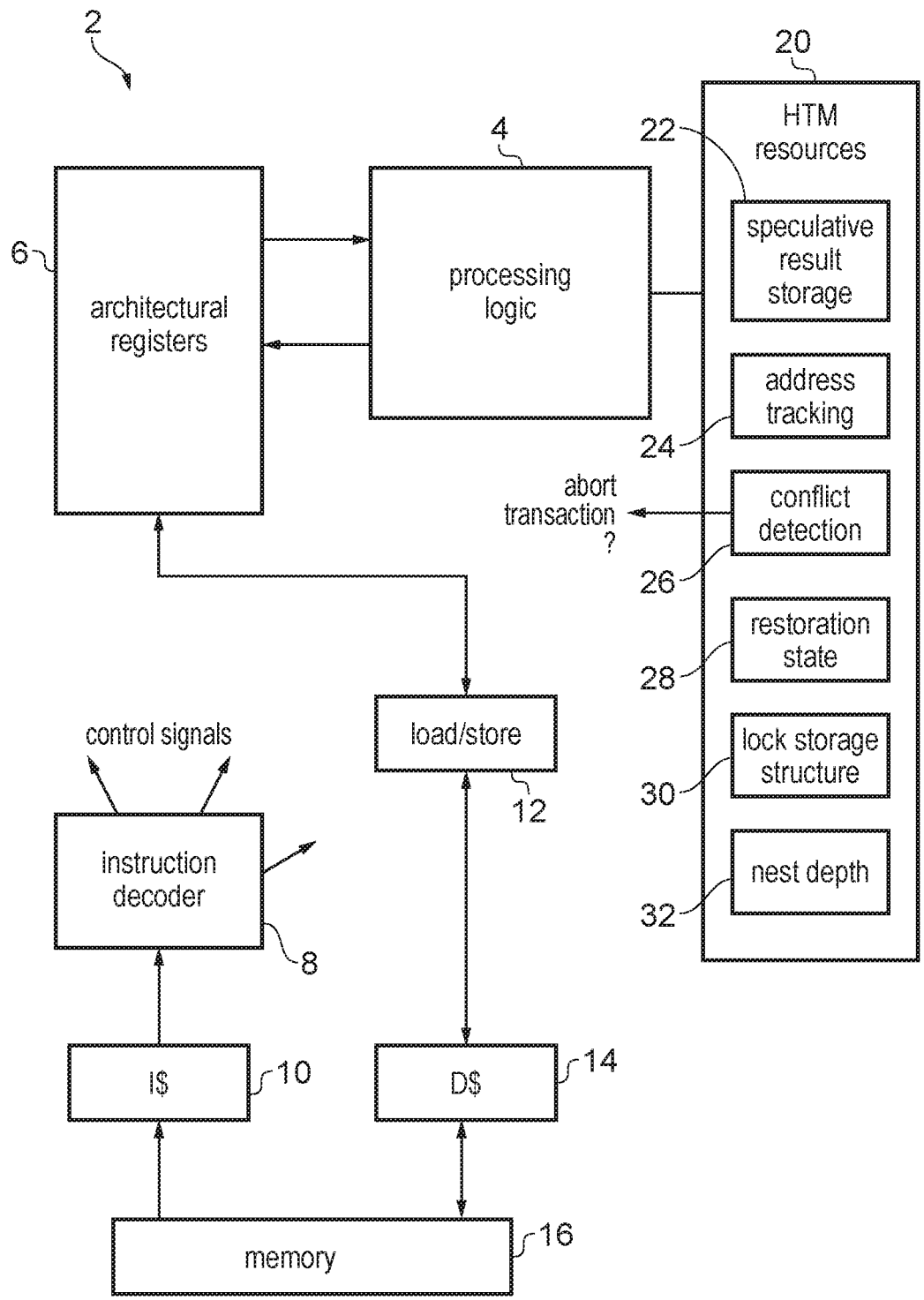
FIG. 1 schematically illustrates an example of data processing apparatus having transactional memory support circuitry.

During processing of a transaction, addresses can be tracked as part of a read set or a write set of addresses following accesses triggered by instructions within the transaction. When an instruction reads data from an address in memory, that address is labelled as part of the read set; when an instruction writes data to an address in memory, that address is labelled as part of the write set. If, at some point between the transaction start instruction and the transaction end instruction, another instruction from outside of the transaction triggers a read or a write access to any address in the write set, this may trigger an abort. Similarly, if any instruction outside of the transaction performs a write access to any address in the read set, this may also trigger an abort of the transaction. It is therefore useful to record read-set information identifying which addresses are in the read set.

The apparatus according to the present technique includes processing circuitry to process threads of data processing, and transactional memory support circuitry to support execution of a transaction within a thread processed by the processing circuitry. The transaction includes instructions of a thread executed speculatively between a transaction start instruction and a transaction end instruction, and the processing circuitry is arranged to prevent commitment of results of the speculatively executed instructions until the transaction end instruction is reached. The transactional memory support circuitry triggers an abort of a transaction in response to detecting a write access from another thread to one of a read set of addresses tracked for the transaction, as discussed above. The apparatus also includes a cache having a plurality of entries, in which each entry is associated with one of a plurality of addresses and specifies a replaceable-information value associated with that address. The replaceable-information value is information for which outside of the transaction processing would be functionally correct even if the information was itself incorrect. While the transaction is pending, the transactional memory support circuitry is configured to identify, based on an encoding of the replaceable-information values, read-set information identifying addresses in the read set of addresses tracked for the transaction.

It should be noted that while the replaceable-information values represent information which could be lost without affecting functional correctness when they are not being interpreted as read-set information (outside the transaction), an error in the read-set information could affect the functional correctness (and in some examples error detection codes may be provided to enable detection of such errors).

This approach can provide an efficient technique for storing read-set information in a data cache. Rather than requiring a separate storage location to store the read-set information, or an additional field in the data cache, this technique requires little or no additional space in the cache to store the read-set information. To a skilled person, it might seem counterintuitive to replace the replaceable-information values in this way, since this means that some information is lost in encoding the read-set information. However, provided that the values identified as replaceable-information values outside the transaction are not required to ensure the functional correctness of the processing performed by the processing circuitry—that is, the replaceable-information values are values for which the processing would be functionally correct even if the values themselves were incorrect—re-encoding these values to instead represent the read-set information will not affect the overall functional correctness of the processing performed by the processing circuitry. The inventors of the present technique realised that although there may (in some examples) be a slight performance effect due to the removal or re-encoding of these values, this is likely to be outweighed by the improvements in hardware efficiency due to reducing the amount of storage required to store the read-set information. In any case, some implementations may avoid loss of performance by exploiting redundancy in the encoding of the replaceable-information values.

In some examples of the present technique, the transactional memory support circuitry responds to the transaction start instruction (or to a subsequent event following the transaction start instruction, such as the first access to the relevant cache set since the transaction start instruction) by setting the encoding of the replaceable-information values to identify the read-set information. In a transaction with several nested transactions (e.g.

multiple transaction start instructions being encountered before the transaction end instruction is encountered), the setting of the encoding of the replaceable-information values to identify the read-set information may occur in response to the outer (e.g. first) transaction start instruction. Hence, the transactional memory support circuitry may, on or following entry to a pending transaction, update the encoding of the replaceable-information values to indicate that these values now represent the read-set information of the transaction, instead of (or in addition to) other information previously represented by these values before the transaction became pending.

In some examples, the number of permitted encodings of the replaceable-information values outside of the transaction is limited to some maximum value. Then, following the transaction start instruction, the encoding of the replaceable-information values is set to one of the non-permitted encodings in order to identify the read-set information.

In this way, some encodings of the replaceable information values are reserved for use in identifying read-set information values, providing a simple technique for encoding the replaceable-information values, and ensuring that a valid encoding of replaceable-information values outside a transaction cannot be mistaken for read set information inside a transaction.

In some examples, the non-permitted encoding selected to identify the read-set information is a redundant encoding providing a functionally equivalent result to another permitted encoding.

This takes advantage of redundancy that is often present in encoding of replaceable-information values, thus allowing some encodings to be reserved for use in identifying read-set information without negatively affecting the performance of the system outside of the transaction.

In some examples, it is ensured that there is a Hamming distance of at least three between the encoding set following a transaction start instruction and any permitted encoding outside of the transaction.

The Hamming distance of a pair of values is the number of bits that need to change state in order to go from one value to the other. For example, a minimum Hamming distance of three, as required by some examples of the present technique, means that at least three bits need to be changed or flipped in order for the value to go from one value to another. More particularly, in this example a Hamming distance of at least three between the encoding set in response to the transaction start instruction and any permitted encoding outside of the instruction means that in order to switch from the first encoding set to the second requires a minimum of three bits to be changed. This allows double error detection to be implemented, which ensures the security of the system and allows it to comply with certain functional safety requirements.

In some examples, the non-permitted encoding is an encoding in which more than a predetermined number of replaceable-information values in a subset of the replaceable-information values have some predetermined value.

The subset of the replaceable-information values referred to above may be just a limited number of the replaceable-information values associated with the entries of a set in a set-associative cache, alternatively it could be all of the replaceable-information values associated with that set. In these examples, the replaceable-information values are interpreted as read-set information when the number of values in the subset taking a particular value is above some threshold. Likewise, the processing circuitry determines that if the number of replaceable-information values is below or equal to a second threshold values (which may be equal to or lower than the first threshold, depending on the desired level of error detection) the encoding should be interpreted as replaceable-information values. In the case where the first and second thresholds are different, they may in some examples differ by enough to give a particular desired Hamming distance between the two encodings—such as a Hamming distance of three. This provides an efficient technique for encoding the replaceable-information values without requiring additional storage space in the cache.

In some examples of the present technique, an encoding-indicator field is included in the cache. This field stores an encoding-indicator value to indicate to the processing circuitry the encoding of the replaceable-information values.

This is an alternative example of an efficient form of encoding of the replaceable-information values, in which a small number of additional bits—i.e. the encoding-indicator field—are added to the cache storage to indicate how the encoding of the replaceable-information values should be interpreted. Although, unlike other examples, this does require a small amount of additional storage space in the cache, only a small number of additional bits are needed. Also, an advantage of this approach is that it leaves all of the replaceable-information values available for storing read-set information or other useful information when the encoding-indicator field indicates that the values should be interpreted as such.

In some examples, in response to the transaction start instruction, the transactional memory support circuitry is configured to select the encoding of the replaceable-information values to reduce a number of bits used for the information for which processing would be functionally correct even if the information was incorrect.

Accordingly, not all of the performance benefits related to the replaceable-information values are lost in changing the encoding of the values, but some are still provided even when encoding read-set information. That is, with this approach even within a pending transaction, in addition to representing the read-set information, the replaceable-information values still also indicate some of the replaceable-information that was present before the transaction started, but with a smaller number of bits to provide less precision.

In some examples, a first portion of the read-set information comprises error detection information for detecting errors in the read-set information.

By including error detection information within the read-set information, robustness against faults can be provided by providing bits that can be used to check the correctness of the read-set information.

When error detection information is included in the read-set information, in some embodiments this may mean there are insufficient bits left in the replaceable-information values for representing, separately for each cache entry, an indication of whether that entry corresponds to an address in the read set for the transaction. In some examples, this may not be a problem, as the allocation of data to the cache may be controlled so that addresses which are in the read set are allocated to entries for which the read-set information is capable of identifying as part of the read set, and if the read set becomes large enough to include an address for which there is insufficient space in the read set information to indicate that address as part of the read set, the transaction can be aborted. Hence, the maximum number of cache entries (or maximum number of cache entries within a given set of a set-associative cache) that can be indicated as part of the read set may be less than the total number of entries (or total number of entries in the given set of the set-associative cache), in some examples.

However, other examples may encode the read-set information so that whether or not each of N locations of the cache relate to addresses in the read set can be encoded using fewer than N bits, so that it may still be possible to encode whether each location of the cache is part of the read set, even when part of the replaceable-information values are used for the error detection information.

In some examples, the selected encoding of a second portion of the read-set information identifies a group indicator associated with a group of entries in the cache, this group identifier being indicative of whether the associated group is a complete group comprising only entries in the read set or an incomplete group comprising at least one entry that is not in the read set. The second portion also includes at least one entry indicator associated with at least one entry in the incomplete group, the entry identifier being indicative of whether the associated entry is in the read set.

In this way, read-set information can be provided for all entries in the cache even if there is not enough space in the replaceable-information values to provide an indicator for every entry in the cache. This gives a space-efficient technique for recording read-set information for all of the entries in the cache.

In some examples, read-set information for multiple transactions can be identified by the transactional memory support circuitry, based on the encoding of the replaceable-information values.

The present technique is therefore highly versatile, being useable for providing read-set information for a plurality of transactions with little or no additional storage space required in the cache.

In some examples, the read-set information for each of the plurality of transactions share an error detection code.

This is an efficient way of providing error detection capabilities for a plurality of transactions that uses a limited amount of storage.

In some examples, in response to execution of the transaction end instruction or an abort of the transaction, the processing circuitry is configured to interpret the replaceable-information values of the plurality of entries as the information for which processing would be functionally correct even if the information was incorrect.

In this way, the encoding of the replaceable-information values identifies that the values are to return to their original function after the transaction is complete. The same set of values can therefore provide two functions depending on their encoding—either providing their original function, or identifying read-set information for one or more transactions.

In some examples, after the transaction has completed, the transactional memory support circuitry replaces each of the replaceable-information values of the plurality of entries with a value uncorrelated with the corresponding replaceable-information value.

Replacing all of the replaceable-information values in this way allows the security of the system to be ensured, by removing any information that could be used by an outside entity to determine which addresses have been accessed by a transaction. A value uncorrelated with the corresponding replaceable-information value could, for example, be a random value; alternatively the value could be a default value, for example all values could be set to 00 or 10 etc.

In some examples the replaceable-information values comprise cache eviction policy information.

Cache eviction policy information is information that allows the processing circuitry or the cache control circuitry to determine which of the plurality of entries should be evicted when allocating a new entry to the cache. This means that the replaceable-information values have a use in improving the performance of the system, but they are not functionally important in terms of ensuring the functional correctness of the system. That is, if the replaceable-information values are incorrect outside of the transaction, the system still functions as required, although there may be some performance effects. Accordingly, re-purposing these values to identify the read-set information does not affect the functional correctness of processing performed by the processing circuitry.

In some examples, while the transaction is pending and the replaceable-information values are being used to identify read-set information for the transaction, the processing circuitry selects cache lines for eviction from the cache independently of the replaceable-information values.

If the replaceable-information values are cache eviction policy information, then during processing of the transaction an alternative cache eviction policy may need to be implemented. Many cache eviction policies can be used, one of which involves randomly selecting lines of a cache to be replaced, another can be a round robin replacement policy. This is not the most efficient cache eviction policy, since it may lead to frequently accessed cache lines being removed from the cache which negatively effects the performance of the system, however, random or round robin replacement is a functionally correct cache eviction policy. Replacing cache lines randomly will not affect the overall functional correctness of the system. Thus by defaulting to a random replacement cache policy while a transaction is pending, the replaceable-information values can be re-encoded as read-set information while still being able to implement some form of cache eviction policy.

In some examples, amended eviction policy information is encoded within the replaceable-information values alongside the read-set information whilst the transaction is pending, and this amended eviction policy information is used by the processing circuitry to select cache lines for eviction from the cache when allocating new entries.

In this way a more efficient cache eviction policy than simple random replacement can still be implemented whilst also interpreting some of the replaceable-information values as read-set information.

FIG. 1 illustrates an example of a data processing apparatus 2 with hardware transactional memory (HTM) support. The apparatus has processing logic 4 for executing instructions to carry out data processing operations. For example the processing logic 4 (processing circuitry) may include execution units for executing various types of processing operations, such as an arithmetic/logic unit (ALU) for carrying out arithmetic or logical operations such as add, multiply, AND, OR, etc.; a floating-point unit for performing operations on floating point operands; or a vector processing unit for carrying out vector processing on vector operands comprising multiple data elements. A set of architectural registers 6 is provided for storing operands for the instructions executed by the processing logic 4 and for storing the results of the executed instructions. An instruction decoder 8 decodes instructions fetched from an instruction cache 10 to generate control signals for controlling the processing logic 4 or other elements of the data processing apparatus 2 to perform the relevant operations. A load/store unit 12 is also provided to perform load operations (in response to load instructions decoded by the instruction decoder 8) to load a data value from a data cache 14 or main memory 16 into the architectural registers 6, and store operations (in response to store instructions decoded by the instruction decoder 8) to store a data value from the architectural registers 6 to the data cache 14 or memory 16.

The apparatus 2 also has transactional memory support circuitry 20 which provides various resources for supporting hardware transactional memory (HTM). The HTM resources in the transactional memory support circuitry 20 supports the processing of transactions by the processing logic 4, where a transaction is a series of instructions for which the processing logic 4 does not commit any results of speculatively executed instructions until the transaction has completed. The transactional memory support circuitry 20 may include for example speculative result storage 22 for storing speculative results of transactions, address tracking circuitry 24 for tracking the addresses accessed by a transaction, conflict detection circuitry 26 for detecting conflicts between data accesses made by a transaction and data accesses made by other threads, so that a transaction can be aborted when a conflict is detected, and restoration state storage circuitry 28 for storing a snapshot of the architectural state data from the architectural registers 6 at the start of a transaction, so that this state can be restored to overwrite the speculative results of the transaction when a transaction is aborted. Also, the resources may include a lock storage structure 30 for strong lock identifiers and a nesting depth register 32. Although the address tracking circuitry 24 is indicated separately in FIG. 1, as discussed below, in some implementations this may be combined with the data cache 14 so that the data cache includes indications of which addresses are in a read set or write set tracked for the transaction.

During processing of the transaction by the processing logic 4, results of some speculatively executed instructions (e.g. store instructions for storing data to the cache 14 or to memory 16) are stored temporarily in the speculative result storage 22, to be committed once the transaction has completed (assuming it is not aborted). An abort of the transaction may be triggered when the conflict detection circuitry 26 determines that an address in a read set of addresses (e.g. the addresses of the locations in memory that have been subject to a read access triggered by an instruction in the transaction) has been written to by an instruction outside of the transaction. In the case of an abort, the restoration state storage 28 is used to restore the state of the architectural registers 6 to their state before processing of the transaction begun.

It is possible for transactions to be nested so that a further transaction start instruction is received before the transaction end instruction corresponding to a previous transaction start instruction has been encountered, and while the earlier transaction is still pending and has not been aborted. The nesting depth register 32 may track the current nesting depth of transactions to distinguish cases when no transactions have been started, when just a single transaction has been started, or when a further nested transaction has been started within a previous transaction. When no transactions have yet been started the nesting depth may be 0. In response to the first transaction start instruction, the nesting depth may be incremented to 1. If a further nested transaction is started then the nesting depth may be incremented again to 2, and so on. On committing a transaction, the nesting depth may be decremented. Hence, as each respective nested transaction commits, the nesting depth is gradually unwound until all the transactions have committed and the nesting depth is back to 0 again.

Figures 2, 3:
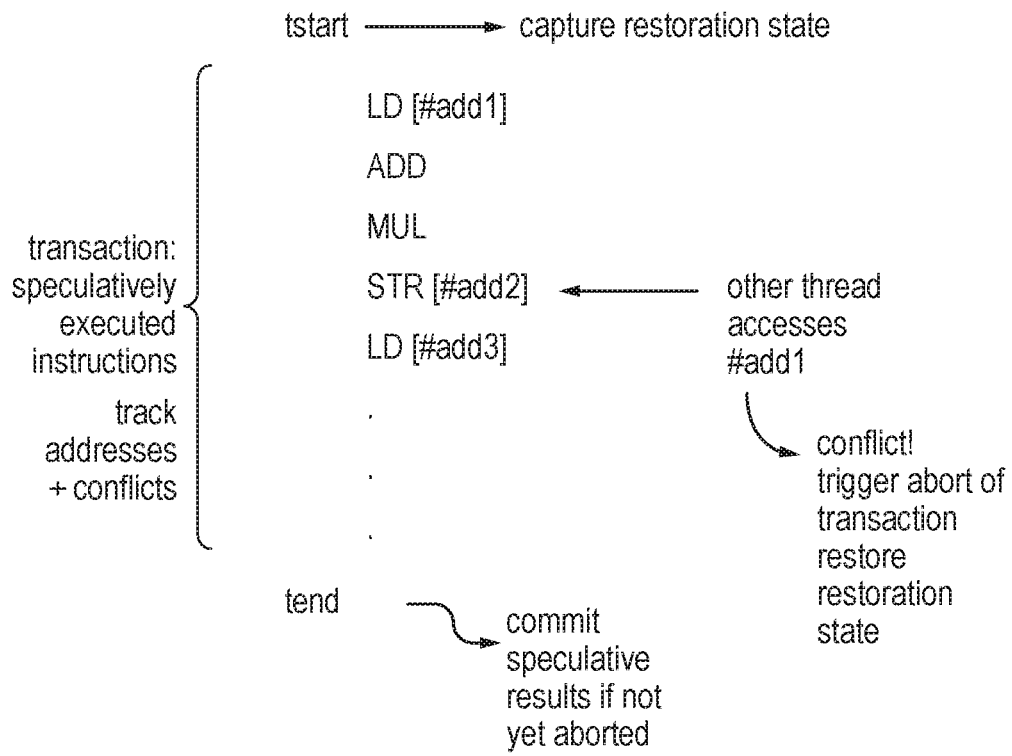
FIG. 2 illustrates an example of processing a transaction in a system with transactional memory support.
FIG. 3 shows an alternative code sequence for executing equivalent operations to the transaction of FIG. 2 in a lock-based mode.

FIG. 2 shows an example of executing a transaction within a given thread using the transactional memory support circuitry 20 and the processing logic 4. A transaction is a section of program code which is bounded by a transaction start instruction (tstart) and a transaction end instruction (tend). In some examples, the transaction end instruction is instead referred to as tcommit—this is the same as tend. As shown in FIG. 2, in response to the transaction start instruction the current architectural state in the architectural registers 6 is captured and stored in the restoration state storage circuitry 28. The processing logic 4 begins to perform speculative execution of the subsequent instructions following the tstart instruction, and as these instructions are executed, the addresses accessed by those instructions are tracked by the address tracking circuitry 24, and the conflict detection circuitry 26 detects conflicts between the tracked addresses and addresses of made accesses using the load/store unit 12 in response to other threads. At least some speculative results of the instructions within the transaction are stored within the speculative result storage circuitry 22. For example the value stored in the cache or to memory in response to a store instruction STR may be held in the speculative result storage 22 while the transaction remains pending. If the transaction end instruction (tend) is reached without an abort event occurring in the meantime, then in response to the transaction end instruction the speculative results are committed. On committing the transaction, any results stored in the speculative results storage 22 for that thread may be written to the data cache 14 or memory 16 and the restoration state 28 can be discarded or permitted to be overwritten as it is no longer needed to rewind architectural state to the point before the transaction start instruction was encountered.

On the other hand, if an abort event occurs, for example when a conflict is detected by the conflict detection circuitry 26 when another thread accesses an address already accessed by the transaction, then an abort of the transaction is triggered and the restoration state from the restoration state storage 28 is restored to the architectural registers 6. Other causes of an abort event could for example include execution of an instruction which is not allowed to be executed within a transaction, insufficient resource within the speculative result storage 22 or address tracking circuitry 24 for handling the speculative results or addresses required by a given transaction, or an interrupt being received during the transaction.

FIG. 2 shows how a certain set of processing operations to be performed may be performed in a transactional mode using the transaction start and end instructions. As shown in FIG. 3, the same set of processing operations can also be performed in a non-transactional mode using a lock-based mechanism. In this case, before starting the section of code, at least one lock checking instruction 40 checks a lock variable identified by a locking address # addLock and checks whether the lock variable indicates that another thread already holds the lock. If another thread holds the lock, then the processing does not progress beyond the lock checking instruction 40 until the lock is released. Once the lock is determined to be available then the lock is claimed by writing a given value (e.g. binary 1) to the lock address # addLock. For example, the lock checking instruction 40 could be implemented using an atomic compare and swap instruction which compares the current value stored at the specified address to determine whether the lock is held, and updates the lock variable to claim the lock if the lock is unclaimed. Alternatively the lock checking could be implemented with a series of multiple instructions to read the lock, test the value of the lock and either cause the processing to be deferred if the lock is already claimed, or claim the lock by updating the lock variable if the lock is currently unclaimed. Having completed the section of code guarded by the lock, another instruction 42 may release the lock once exclusive access to the resource guarded by the lock is no longer required. For example the resource guarded by the lock may be the data locations identified by various addresses which are accessed during the intervening section of code.

A lock-based approach as described above may be useful in situations where, for example, frequent aborts are likely to occur if using a transactional mode. Further, code written to use transactional memory may default back to a lock-based system if frequent aborts do occur during a transaction, in order to allow the sequence of instructions to complete. However, when execution of a transactional-memory-based code sequence succeeds and the transaction is committed, this can often be more efficient than lock-based systems.

Figure 4:
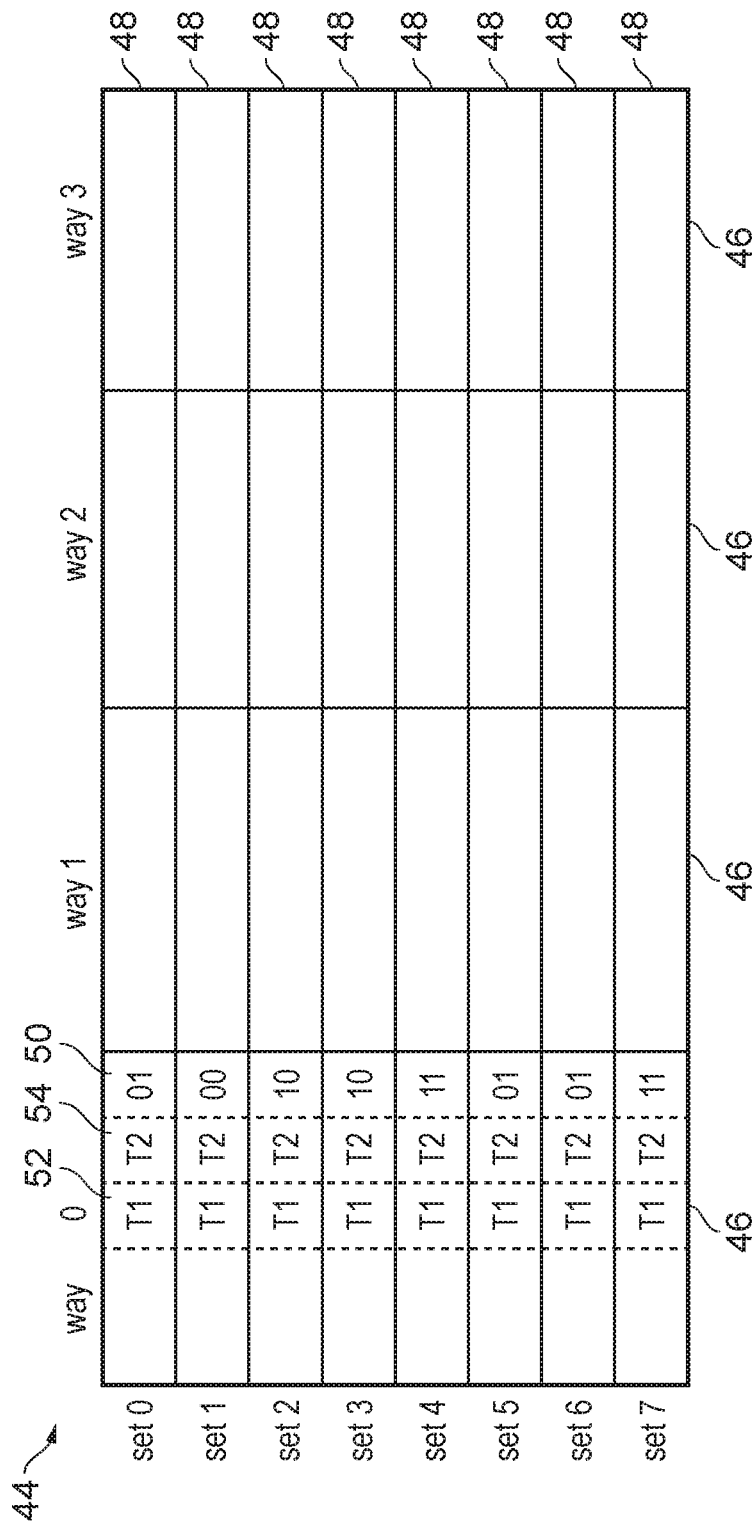
FIG. 4 shows an example of a four-way set-associative cache structure in which methods of the present technique can be applied.

As discussed above, it is useful to be able to track the addresses in the read set—addresses which have been accessed by read requests from within the transaction. FIG. 4 shows an example of how addresses in the read set can be tracked in a four-way set-associative cache 44. As shown in FIG. 4, each way 46 within a set 48 includes at least one field 50 specifying cache eviction policy information. This is information that enables the processing circuitry 4 to select a cache line to evict from the cache when allocating a new line, and in this case is a two-bit value. The cache 44 can also be used to track read-set information. One way to do this is to include an additional field 52, 54 within each way 46 of each set 48 of the cache 44 to record the transactional information, e.g. the read-set information. The example shown in FIG. 4 records transactional information for two transactions, transaction 1 (T1) recorded in field 52 and transaction 2 (T2) recorded in field 54. It should be noted that although only way 0 is shown in FIG. 3 to include the additional fields 52, 54, 50, all four ways 46 in the four-way set-associative cache 44 may include these fields.

An advantage of storing transactional information within a data cache 44 as shown in this figure is that the transactional information is stored alongside the addresses which it is tagging as within the read set. A disadvantage, however, is that additional space is required within the cache in order to store this information. The examples described below help to reduce the amount of storage required to store the read-set information within a cache 44.

Figure 5:
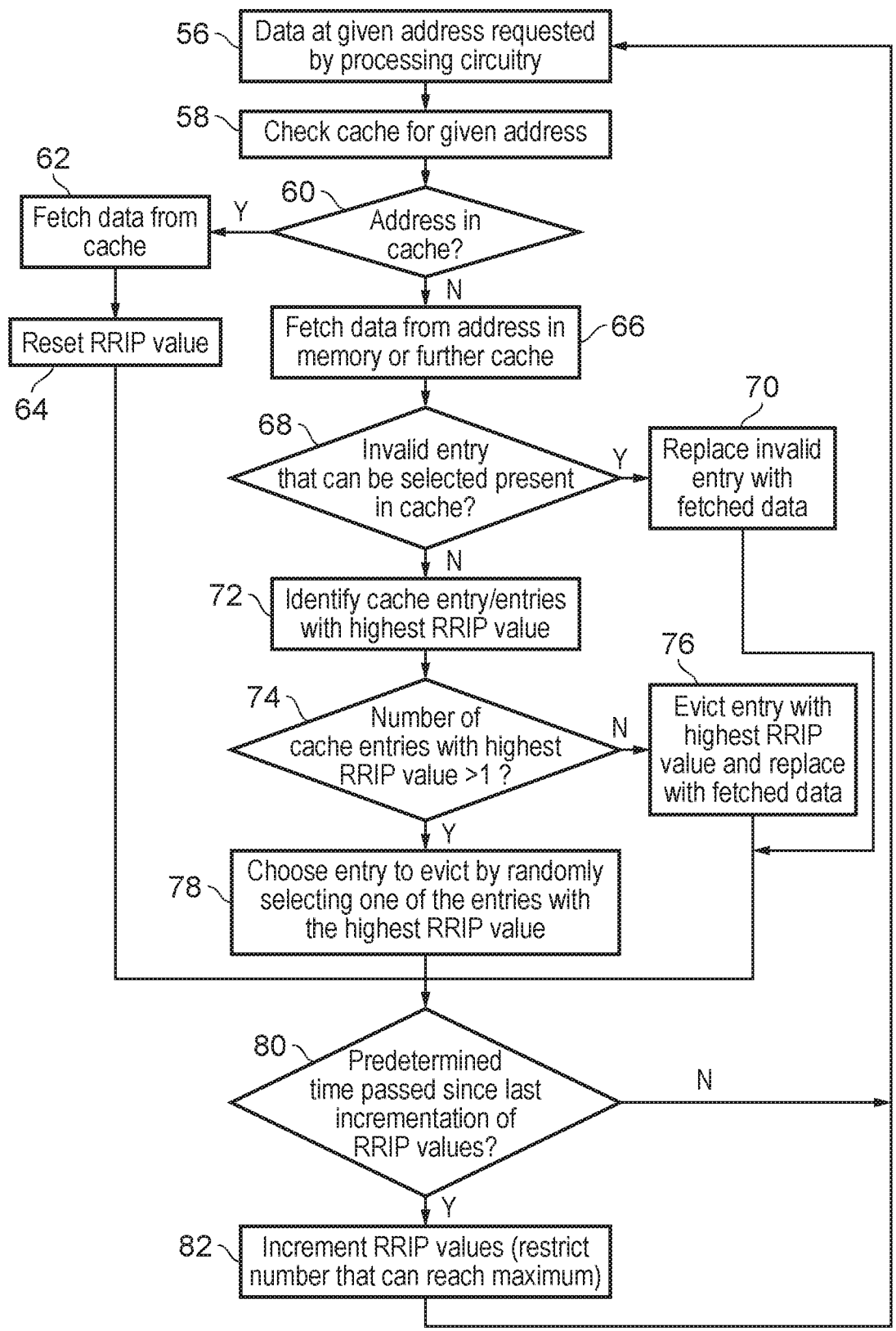
FIG. 5 is a flow diagram showing an example of a cache eviction policy in action in a cache structure.

As mentioned above with regards to FIG. 4, it is common for the cache 44 to include a field 50 recording cache eviction policy information for choosing which line of a cache to evict when allocating a new line. FIG. 5 shows an example process for using said information, in this case using a re-reference interval prediction (RRIP) policy. In such an example, the information stored in field 50 of the cache 44 is an RRIP value.

As shown in FIG. 5, when, at step 56, data at a given address is requested by the processing circuitry the cache 44 is checked (step 58) for a given address. Specifically, the tags of the data stored in the cache 44 are checked against the address provided by the processing circuitry. At step 60, a determination is made as to whether or not the data is available in the cache 44. If the data is available in the cache, the method proceeds to step 62 in which the data is fetched from the cache. At this point the RRIP value in field 50 of the entry is reset to its default value, indicating that the data in this entry has been recently accessed—for example, the default value may be 0 (00, in the two-bit example in FIG. 4). This resetting of the RRIP value indicates that the entry has been accessed recently, and thus should not be a high priority candidate for eviction from the cache.

On the other hand, if the address was not found in the cache in step 60, the data is instead fetched from memory or from a further cache (step 66). For example, if the cache 44 being checked for the address is a level one cache, a level two cache may next be checked followed by any lower level caches after that. Once all the caches have been checked if the data has still not been found the processing circuitry will retrieve the data from memory. This process works for any number of cache levels.

The subsequent steps of FIG. 5 show a process for selecting which entry of the cache to allocate for the data to be fetched from the memory or further cache. It is not necessary to wait for the data to actually be returned from the memory or the further cache before performing these steps—the allocation of an entry for storing the returned data can be made before receipt of the returned data. At step 68, the processing circuitry determines whether an invalid entry exists within the original cache 44 which can be selected to be overwritten by the fetched data. When selecting an invalid entry to be replaced, if the cache 44 is a set-associative cache, it is necessary that the selected entry is within a particular set of entries selected based on the address of the data being allocated to the cache. If an invalid entry that can be replaced is found, the process proceeds to step 70 in which the invalid entry is replaced (over-written) with the fetched data and the invalid entry transitions to valid.

On the other hand, if no appropriate invalid entry is found, the method proceeds to step 72 in which the processing circuitry identifies the cache entry or entries (within the appropriate set) with the highest RRIP value. In this example, a higher RRIP value indicates that the entry has not been accessed for a long time, and is therefore a good candidate for replacement within the cache eviction policy. For a two-bit RRIP value, the processing circuitry will seek to identify any entries with an RRIP value of 3 (11). If no entries have this RRIP value, the processing circuitry will look for entries with the next highest value—2 (10)—and so on.

Once the entry or entries with the highest value have been identified, the method proceeds to step 74 in which the number of entries with said highest value is identified. If only one entry has said highest value, that entry is evicted from the cache and replaced with the fetched data (step 76). On the other hand if multiple cache entries have the same highest RRIP value the method proceeds to step 78, in which the processing circuitry chooses an entry to evict by randomly selecting one of these entries. In other examples, however, rather than randomly selecting an entry the processing circuitry may select the next entry down (i.e. the next way 46 along in the set 48).

Multiple entries having the same RRIP value indicates that there is a level of redundancy within the system, since any of the cache entries with the highest RRIP value are equally valid choices for the cache to evict. Thus there is unnecessary extra redundant information stored in field 50.

Returning to FIG. 5, following the selection of an entry with the highest RRIP value to be evicted in step 78, or following either of steps 64 or 70 or 76, the method proceeds to step 80 in which it is determined whether a predetermined time has passed since the last increment of the RRIP values. As mentioned above, the RRIP values provide an indication of how long it has been since the associated entry has been accessed by the processing circuitry—higher RRIP value implies that it has been a longer time since the entry was accessed. Thus the values are incremented periodically. Following step 80 if a predetermined time has not passed since the last incrementation the method returns to step 56 and repeats. On the other hand if the predetermined time has passed the method instead proceeds to step 82 in which the RRIP values are incremented. Note that while for ease of explanation the incrementing of the RRIP values is shown as part of the method of accessing the cache, the incrementing of the RRIP values may also be triggered on elapse of the predetermined time, even if there has been no cache access to data. Hence, for step 80 it is not a prerequisite that steps 56 to 78 have already been performed. Also, while step 80 shows an example where the increment is triggered by elapse of a predetermined time, in other examples the increment could be triggered after elapse of a predetermined number of processing cycles, a predetermined number of accesses to the cache, or another measure of the elapse of time.

It should be noted that the number of values that can be incremented can, in some examples, be restricted so that only a certain number can reach the maximum value (for example for a 2-bit RRIP value the maximum value would be 11). This will be explained in more detail later.

The examples below take advantage of the aforementioned redundancy within the encoding of RRIP values in order to efficiently store read-set information.

Figure 6:
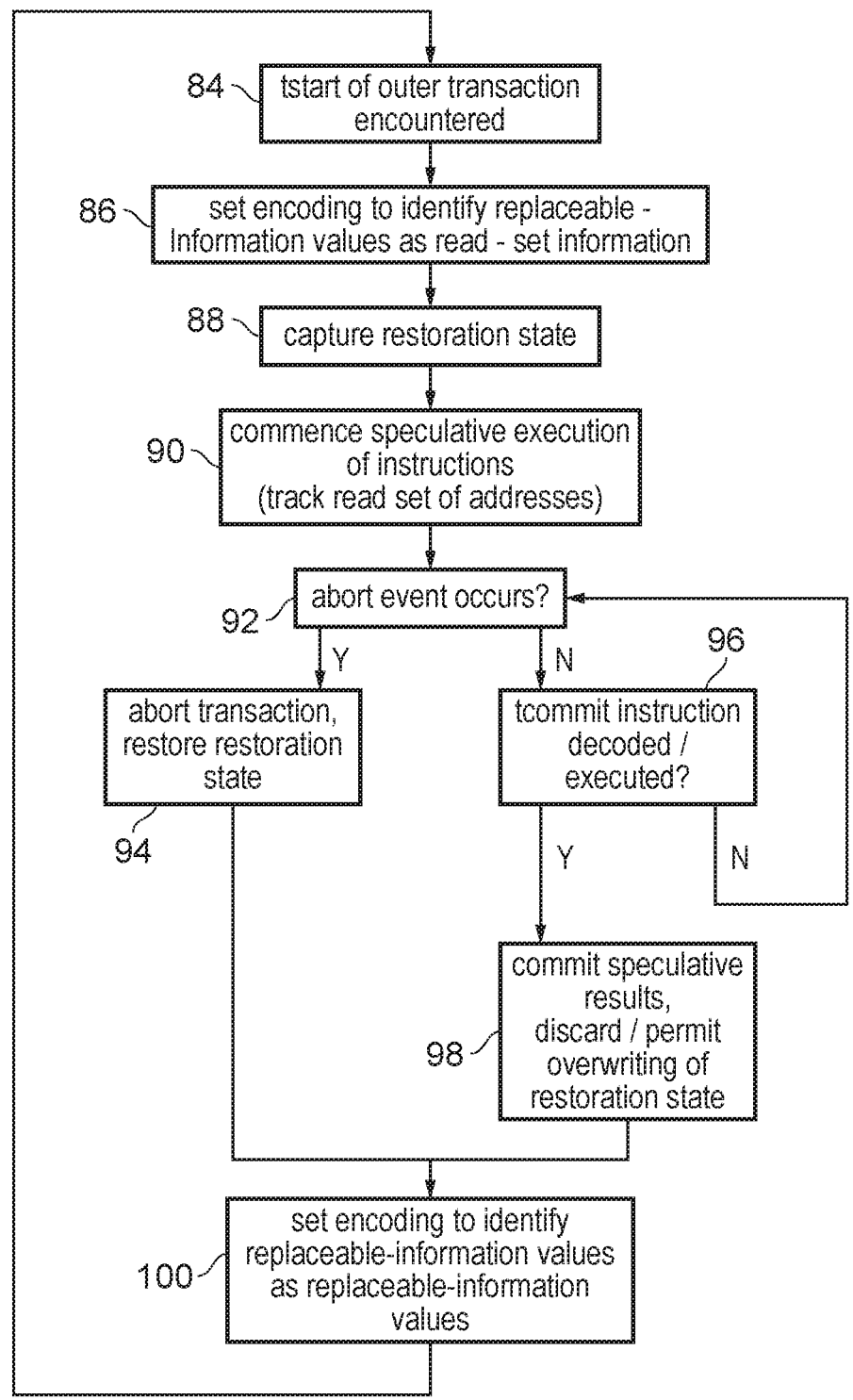
FIG. 6 is a flow diagram showing processing of an example of a transaction.

FIG. 6 is a flow diagram illustrating a method of processing transactions. At step 84 a transaction start (tstart) instruction of the outer transaction is decoded and executed. The transaction start instruction of the outer instruction is a transaction start instruction which is not encountered within another transaction (i.e. it is not a nested transaction). In response, at step 86 the encoding of the replaceable-information values (e.g. the cache eviction policy information stored in field 50) is set to identify these values as read-set information, identifying the addresses which form part of the read set of addresses for the transaction. When the transaction first starts, there will not be any addresses that are part of the read set, but nevertheless in response to the tstart instruction of the outer transaction, the replaceable information values may be set to an encoding that is not permitted outside a transaction, to represent that they indicate read-set information.

In some examples, rather than setting the encoding to identify the replaceable-information values as read-set information (step 86) in response to the tstart instruction of the outer transaction being encountered (step 84), it could instead be set on a per-set basis. That is, when a line is allocated to a particular set in the cache, the encoding for that set is then changed. In this case, step 86 would follow step 90. This is also the case for the following figures. Hence, either the encoding may be set directly in response to the tstart instruction being encountered, or the encoding of the replaceable-information values associated with a particular set of the cache could be set in response to the first line in the read set being allocated to the particular set of the cache after the transaction start instruction. In such examples, during processing of a transaction, if at a given time the encoding of the replaceable-information values associated with a particular set of the cache is not set to identify the replaceable-information values as read-set information, this implies that there has been no access to that cache set since the transaction start instruction, and so the processing circuitry is configured to determine that none of the addresses in that cache set are part of the transaction's read set at that time.

Note also that, if multiple transactions' read sets are indicated using the same block of replaceable-information values associated with a given cache set of the set-associative cache, then it is possible that when another transaction starts, another transaction may already be pending (e.g. on a different processing element sharing the same cache) and so the encoding of the replaceable-information values may already have the encoding for indicating that the replaceable-information values represent read set information, in which case step 86 may not need to be performed again.

In step 88, the restoration state storage 28 captures a current snapshot of the architectural state in the architectural registers 6, as the restoration state to be maintained for the transaction. It will be appreciated that while in some cases this could result in the captured architectural state being written to separate registers, other implementations may use a physical register file for the architectural registers 6 which has a greater number of registers than the number of registers supported in the instruction set architecture, with register renaming being used to remap which particular physical register is considered to store the data value for a particular architectural register required by the architecture. In such a system, register renaming could be used to change the mapping from architectural registers to physical registers on encountering a transaction start instruction, so that previously captured checkpoints of architectural state could effectively be maintained within the same physical register file as the current architectural state itself, which can speed up restoration of state if necessary. In this case, the capture of restoration state could be done by changing the register mappings so may not need any actual transfer of data to/from physical registers.

At step 90, speculative execution of instructions following the transaction start instruction begins. While instructions are executed speculatively within the transaction, results of some speculative instructions may be allocated to the speculative result storage circuitry 22 (e.g. results of store instructions for storing data to memory). Addresses accessed by read instructions in the speculatively executed instructions are tagged as part of the read set of addresses by setting a value in the replaceable-information values accordingly (or by updating the encoding of the set of replaceable-information values for a set of a set-associative cache), and while the transaction remains pending write accesses by other threads to the read set of addresses for the transaction may be monitored.

At step 92 the conflict detection circuitry 26 detects whether an abort event has occurred. For example the abort event could be another thread writing to one of the read set of addresses tracked by the read-set information stored in the cache 44 (or another thread reading one of the addressed tracked in the write set for the transaction), the occurrence of an interrupt or exception, the execution of an instruction type which is not allowed to be executed within a transaction, or the resources available for address tracking or speculative result storage 22 being fully utilised so that it is no longer possible to continue to safely execute the transaction (as some additional addresses or speculative results which may need to be stored may not be able to be tracked anymore). It will be appreciated that other types of abort could also be defined depending on the constraints of the instruction set architecture. If an abort event occurs then at step 94 the transaction is aborted and the restoration state stored in the restoration state storage 28 is restored to the architectural registers 6 which represent the current architectural state of the system. Processing may then resume from the earlier point of executing represented by the restored architectural state. In some cases, on aborting a transaction, the microarchitecture may provide a hint which indicates the reason why the transaction is aborted, which could be used by an exception handler in software to determine whether it is worth attempting to execute the required operations as a transaction again, or whether it is preferable to retreat to executing a fallback path (which does not use transactions) to execute the corresponding processing operations.

If no abort event occurs at step 92, then at step 96 it is determined whether any transaction end (tend) instruction has been decoded and executed (again, due to nesting, step 96 may check for the tend instruction of the outer transaction, based on nesting depth register 32). If not then the method loops back to step 92 to await either an abort event or the execution of a transaction end instruction. It will be appreciated that the speculative execution of instructions and the tracking of the working set of addresses and potential conflicts continues throughout steps 90 to 96 until either an abort event occurs or a transaction end instruction is reached.

When the outer-most transaction end instruction is executed then at step 98 any speculative results of the transaction are committed to state and the previously captured restoration state is discarded or permitted to be overwritten. Once the transaction has completed, in step 100 the encoding of the replaceable-information values is set to identify these values according to their original use—information for which processing would be functionally correct even if the values were incorrect, such as cache eviction policy information.

It should be noted that step 100 need not necessarily follow set 94 or step 98 immediately. This changing of the encoding can occur at any time when the processing system is not executing the transaction. If no transaction is pending, but the replaceable-information values are still encoded to indicate transaction read set, the cache replacement may be controlled based on the same default replacement policy used during the transaction (e.g. either a random/round-robin selection if there is no replacement policy information encoded at all during the transaction, or if replacement policy information is retained with a reduced number of bits during the transaction, a modified replacement policy based on the reduced information). The resetting of the encoding of the replaceable-information values following the end of a transaction could take some time, as it may require a cache scrub to reset the replaceable-information associated with a relatively large number of cache sets, which can take some time and may not be timely with the execution of the tend instruction. Hence, in general this may follow the tend instruction, but other instructions after the tend instruction may be processed in the meantime while resetting of the encoding of the replaceable-information values proceeds in the background.

Figure 7:
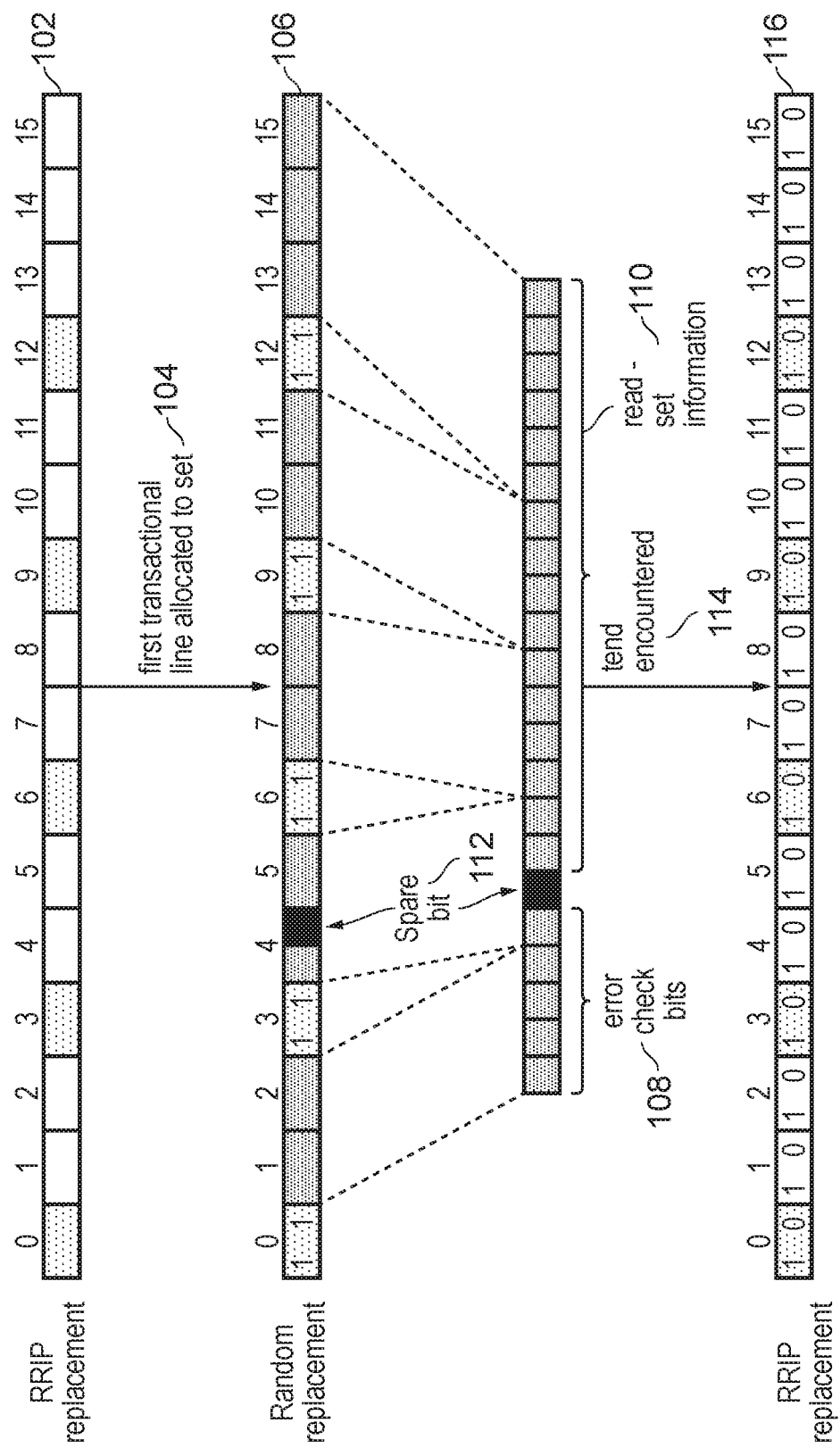
FIGS. 7-9 show examples of encoding replaceable-information values to be interpreted as read-set information.

FIG. 7 shows how replaceable-information values, such as cache eviction policy information, can be re-encoded to be interpreted as read-set information. In FIG. 7, the replaceable-information values are initially interpreted as RRIP values 102. For example, with this encoding, a RRIP replacement policy is used, as described in FIG. 5. In FIG. 7, there are shown 16 fields to identify replaceable-information values for 16 ways of a sixteen-way set-associative cache. It will be appreciated the diagram only shows the RRIP values for one set of the cache, and a similar group of RRIP values would be provided for each other set of the set-associative cache. When the replaceable-information values are to be interpreted as cache eviction policy information 102, each of the sixteen replaceable-information values gives cache eviction policy for one of the sixteen ways of a given set in the sixteen-way set associative cache. In this example, while the replaceable-information values are considered to represent RRIP values 102, the values held in a subset of the entries—in this case, entries 0, 3, 6, 9 and 12—are restricted such that no more than a predetermined maximum number of these entries can have a value of 3 (0b11). For example, in this case, the maximum number is two, and so no more than two of the entries in this subset can store a value of 11 while the values represent RRIP values.

When a cache line corresponding to an address in the read set is first allocated to the set 104—or when a tstart instruction is encountered—the encoding of the replaceable-information values is changed, so that it identifies that the values are now to be interpreted as read-set information 106. In the example shown in FIG. 7, the encoding is set by replacing all of the entries in the subset described above (entries 0, 3, 6, 9 and 12) with the value 11. Whenever all 5 of the entries in the subset show this value, the replaceable-information values are to be interpreted as read-set information, and thus replacing all of the entries in the subset with this value indicates that the replaceable-information values are to be interpreted as read-set information. In alternative examples, the subset of entries may instead be the entire set of entries. The encodings where 3 or 4 of the subset of entries (e.g. 0, 3, 6, 9 and 12) are set to 0b11 are considered invalid, so the transaction is aborted if one of these encodings is detected. This ensures that the Hamming distance between a valid replacement-policy encoding used outside a transaction and a valid read-set encoding inside a transaction is 3, so that there is double error detection capability (even if two of the bits of entries 0, 3, 6, 9 and 12 change state due to alpha particle strikes or other single-event upsets, the error can still be detected, even if the entries 0, 3, 6, 9 and 12 are not subject to error protection using an error detecting/correcting code).

Once the encoding has been changed to identify the replaceable-information values as read-set information, in the example of FIG. 7, the cache eviction policy switches to a replacement policy which is independent of the contents of the replaceable-information values, e.g. a random replacement policy, in which cache entries to be evicted are selected at random, or a round robin replacement policy, in which the entry selected as the victim entry cycles through each entry of the set in a particular sequence. This may be less efficient than other replacement policies which consider information on the recent usage of the entries, for example RRIP, but it is still functionally correct.

As shown in FIG. 7, the additional bits not used to indicate that the encoding of the replaceable-information values is to be interpreted as read-set information—in this case the bits in fields 1, 2, 4, 5, 7, 8, 10, 11 and 13 to 15, can now be used to store error check bits 108 and read-set information 110. Although in this example, read-set information and error check bits have been described separately, it should be understood that in the context of this application "read-set information" is intended to cover both the read-set values and the error check bits. As is shown in this figure, this particular configuration also leaves a spare bit 112, which can be used to store additional information.

In response to the tend instruction 114 being encountered, this indicates that the encoding should be reset to identify the values as RRIP values. This will involve replacing at least some of the replaceable-information values in the subset discussed above with that values that are not 11, but may also optionally include changing others of the RRIP values. In the example shown in this figure all of the values 116 are replaced with the same value 10, in order to hide any sensitive information that may have been determinable from the read-set information before it was replaced. In some other examples, however, the read-set information can instead be replaced with a random set of values (provided the number of values taking the highest value is not above the predetermined maximum). At this point the processing circuitry returns to an RRIP replacement policy, and over time the values will be updated to more accurately reflect which entries should be replaced within the cache eviction policy.

The particular example described above gives a space-efficient technique for storing read-set information. This is because no additional bits are needed to store the encoding, as the read-set encoding is simply set by setting a certain number of the replaceable-information values to the maximum possible value. The trade-off for this approach, however, is that fewer values are available for storing read-set information, since some of the values are taken up by providing the encoding. On the other hand, the example shown in FIG. 8 uses three additional bits 118 to mark the encoding of the replaceable-information values. Initially, while the replaceable-information values are used to cache eviction policy information values 120, the additional bits 118 are set to 000. This is the encoding which indicates to the processing circuitry 4 that the replaceable-information values should be interpreted as such. When a cache line corresponding to an address in the read set is first allocated to the set 122—or when a tstart instruction is encountered—the additional bits 118 are replaced with the bits 111, and the processing circuitry 4 is configured to interpret the replaceable-information values as read-set information when the additional bits 118 are set to 111. In this situation 124 each entry identifies the read-set information for one of the ways of the sixteen-way set associative cache. Then, in response to a tend instruction being encountered 126, the additional bits 118 are reset to 000 and the replaceable-information values are again interpreted as cache eviction policy information 128. The replaceable-information values may also be replaced with random values (or identical values as in the example of FIG. 7).

Using three additional bits rather than, for example, two additional bits in the field 118 allows double error detection to be provided. This is because in order to change from an encoding 000 to an encoding 111, a Hamming distance of 3 is required; that is, three bits need to be replaced in order to go from one value to the other. As the probability of 3 bits changing state may be extremely low in practice, this is a particularly secure way to encode the replaceable-information values.

Figure 8:
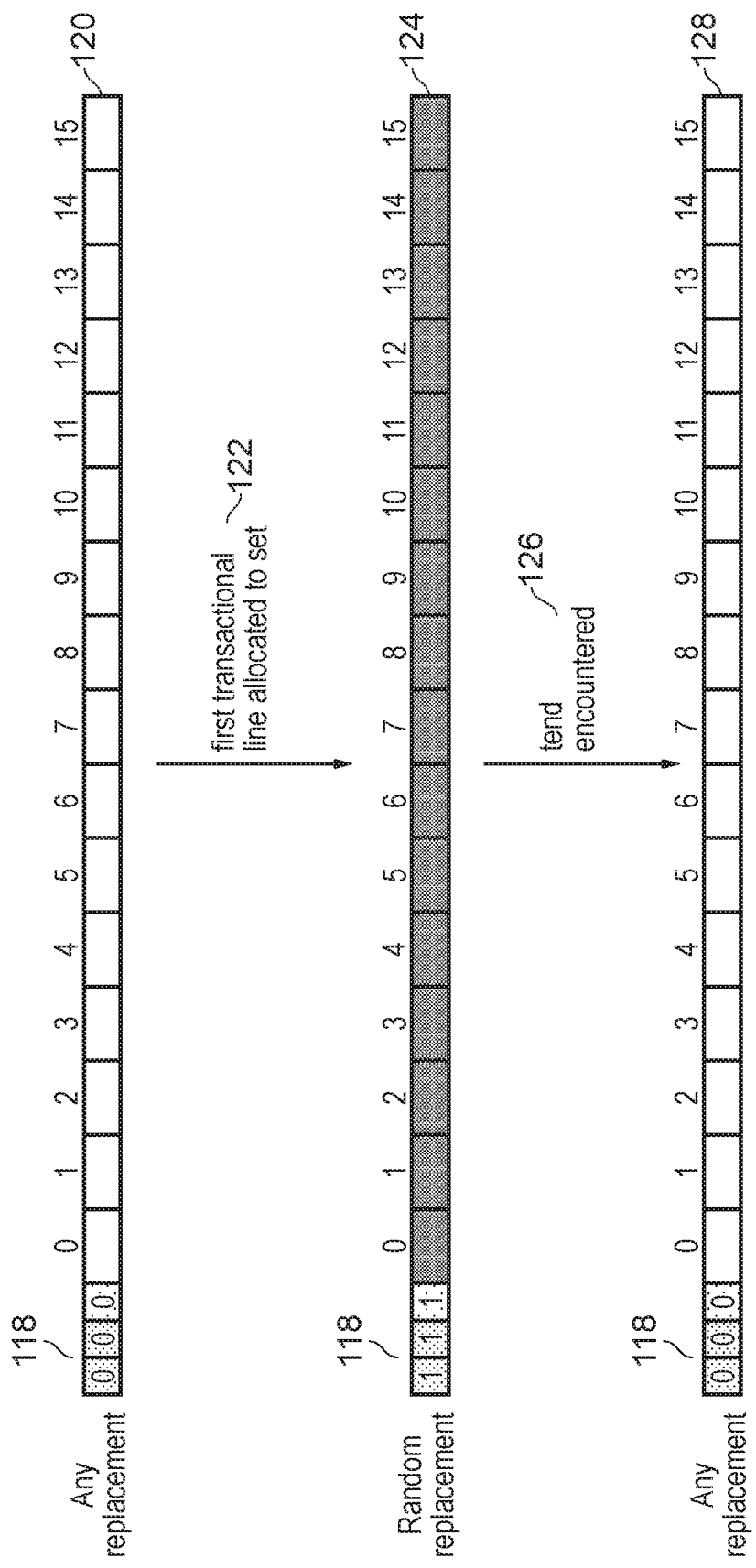
Figure 9:
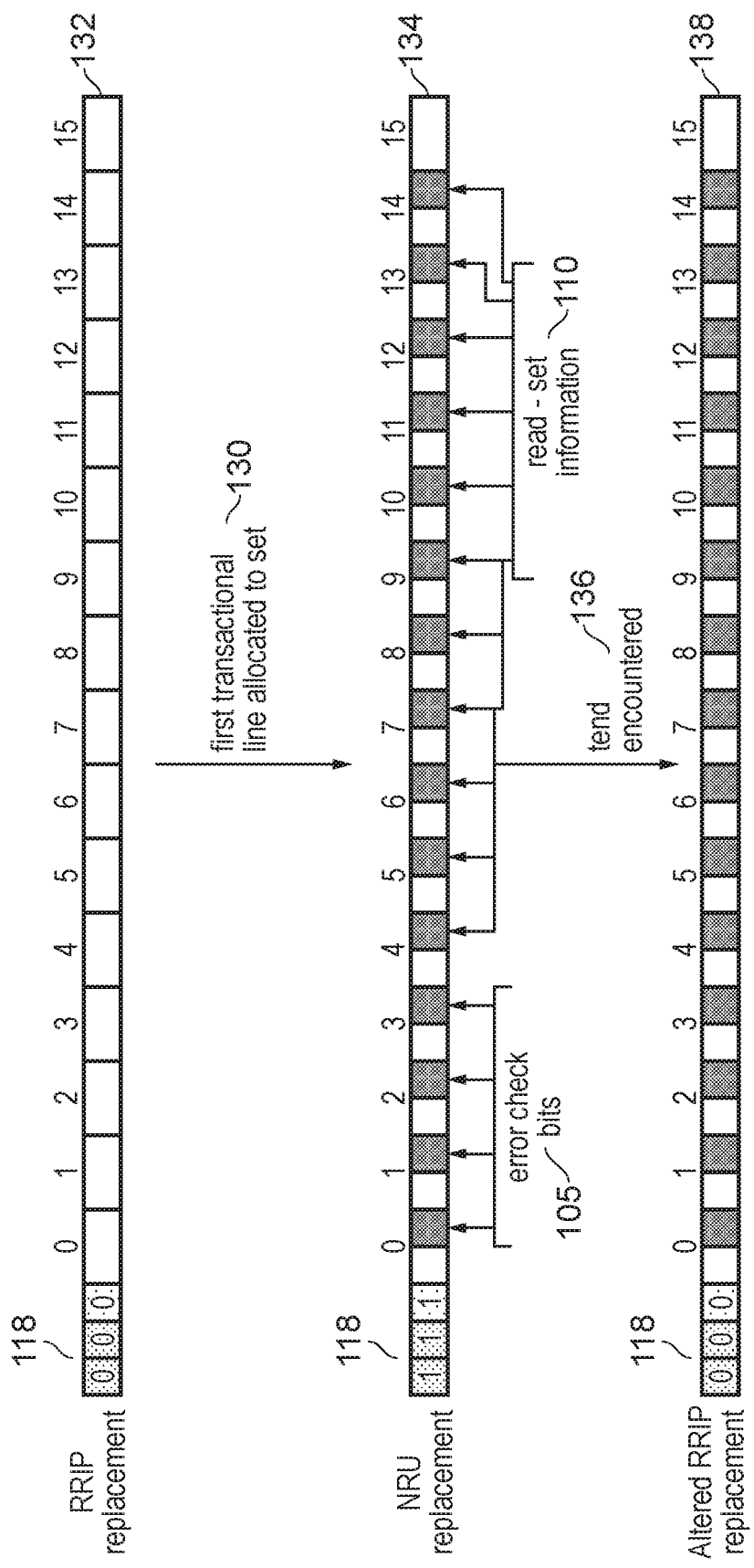

Encoding the replaceable-information values in the manner shown in FIG. 8, requires more space in the cache, but may allow additional information to be stored. For example, FIG. 9 shows an example in which some cache eviction policy information still remains once the tstart instruction is encountered 130. In this example, the replaceable-information values again initially represent RRIP values 132. However, unlike previous examples, when a cache line corresponding to an address in the read set is first allocated to the set 130—or when the tstart instruction is encountered—only half of the bits following the field 118 are replaced with read-set information (which includes error check bits). The cache eviction policy information is therefore reduced to a single bit rather than two bits as it was initially 132 so that the other bit of each pair of bits can be used to identify read-set information 134. The most significant bit of the cache eviction policy information therefore remains and can be used in an altered RRIP replacement policy to indicate which cache line should be evicted when the new cache line is allocated. At the same time the read set continues to be identified and an error check code is provided.

In response to the tend instruction being encountered 136, the bits that had been used as error check bits and read-set information are overwritten and the values returned to being interpreted as read-set information values 138. Of course, this also means that the additional bits 118 are returned to the values 000.

The technique shown in FIG. 9 has the advantage that the cache eviction policy information can be maintained in a reduced form, however it has the disadvantage that there are fewer bits available for read-set information. This may mean that only some entries in the cache can be used to store information used in the transaction.

Figure 10:
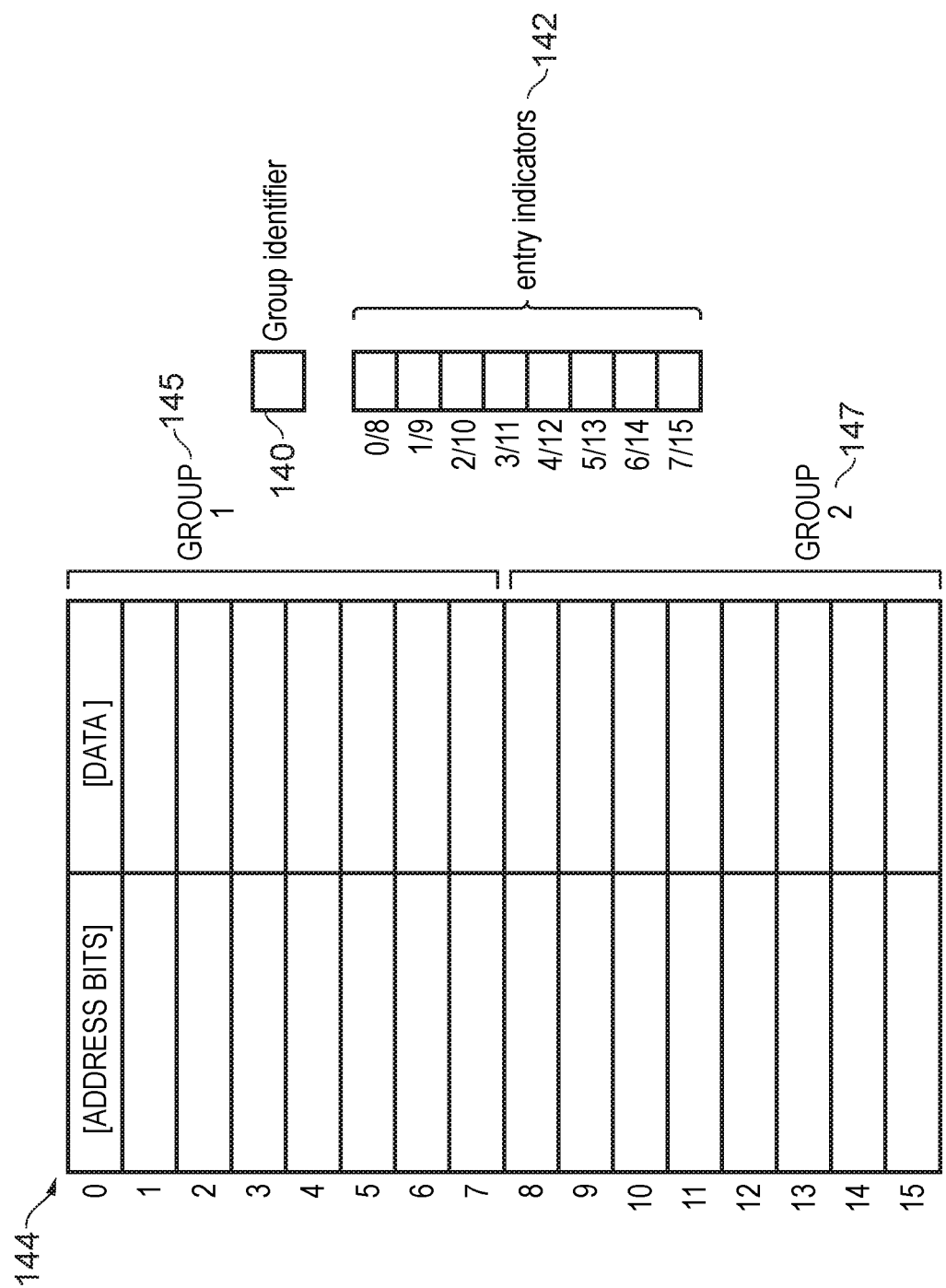
FIG. 10 shows an example of a group identifier and a plurality of entry indicators used to store read-set information for a cache structure.

However, FIG. 10 shows an example where a total of just nine bits can be used to identify read-set information for all 16 entries of a sixteen-way set associative cache. In this example each set 144 is considered to be split into two groups, a first group 145 comprising entries 0 through to 7 and a second group 147 comprising entries 8 through to 15. However, this is just one example of how the set 144 can be split into two groups—other examples can also be used. Each of the entry indicators 142 corresponds to either one of the entries in the first set or one of the entries in the second set depending on the value of the group identifier 140. In this example, the processing circuitry initially only allocates read-set addresses to the first group of the cache 144. Thus the entry indicators each identify read-set information for one of these first 8 entries. When all 8 of these entries are full, the group identifier is set to a predetermined value (for example 1) in order to identify that all entries in the first group comprise addresses within the read set. At this point the entry indicators 142 are reset to their default value (for example 0). The processing circuitry 4 now begins to allocate read-set addresses to the second group of entries in the cache 144—entries 8 through to 15. The entry indicators now identify read-set information for one of the entries in this second group. Thus with just nine bits—the 1 bit of the group identifier 140 and the 8 bits of the entry indicators 142—read-set information can be provided for all 16 ways of a sixteen-way set associative cache 144. For example, if the value of the group identifier 140 is 1 and the values in the first two entry indicators are also 1, this indicates that all of the entries in the first group 145 are in the read set, and the first two entries (entries 8 and 9) in the second group 147 are also in the read set. This can also be provided by providing two group identifiers, one for each group, and only seven entry indicators. In this case, if all entries in the first group 145 are in the read set, the seven entry indicators are reset to 0 and the first of the two group identifiers is set to 1.

Figure 11:
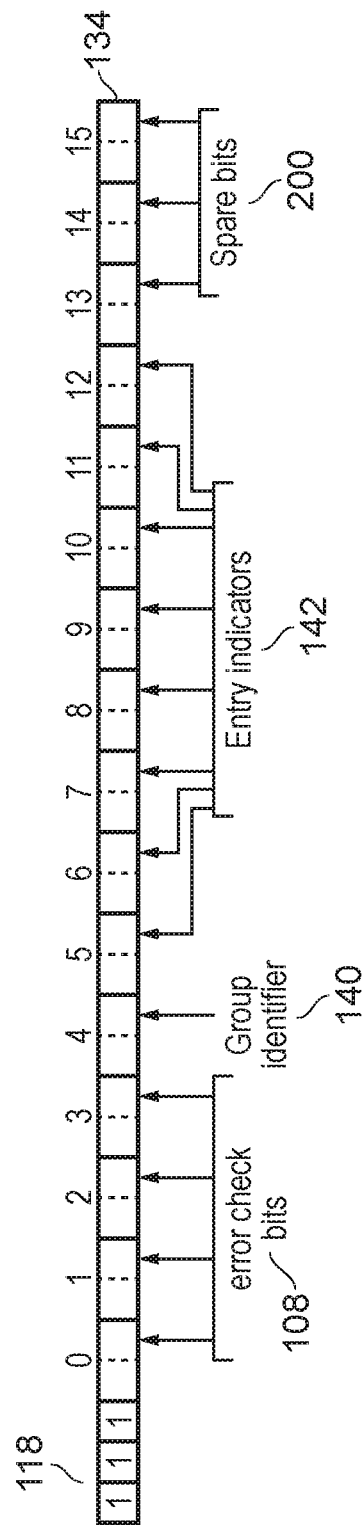
FIG. 11 shows an example of encoding replaceable-information values to be interpreted as read-set information including a group identifier and entry indicators.

FIG. 11 shows how the entry indicators 142 and group identifier 140 shown in FIG. 10 can be implemented within the example of FIG. 9. In this case, since one bit per entry is reserved for cache eviction policy information, a total of sixteen bits remain for storing read-set information. In order to allow four bits to be used as error check bits 108, only twelve bits can be used to store the remainder of the read-set values.

In the example of FIG. 11, there are eight entry indicators 142 in entries 5 through to 12 and a group identifier 140 in entry 4. There are also error check bits 108 in entries 0 to 3 and three spare bits 200 in entries 13 to 15. All of this is done while still allowing one bit from each of these entries to be used as cache eviction policy information.

In other examples, the number of bits used to represent the read-set information for each location in a given set may be reduced further by dividing the set into more than 2 groups. For example, the read-set information for 4 groups of 4 entries within a set could be represented with 7 bits (either 4 group identifiers 140 and 3 entry indicators 142, or 3 group identifiers 140 and 4 entry indicators 142). Hence, in general with this encoding read-set information for a set of M*N cache entries, comprising M groups of N entries per group, could be represented with M+N−1 bits.

Figure 12:
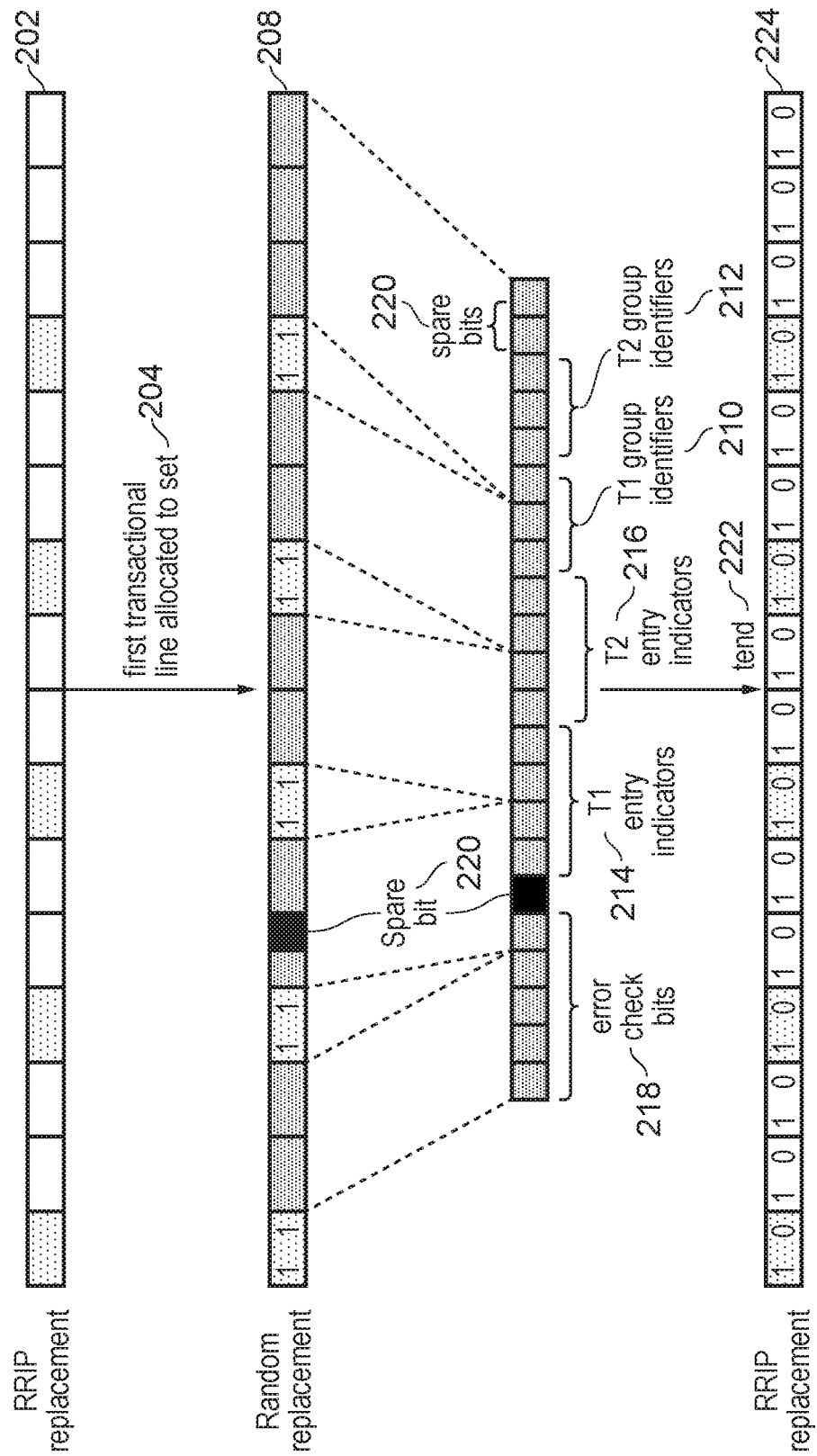
FIG. 12 shows an example of encoding replaceable-information values as read-set information.

In some examples of the present invention, multiple transactions' read-set information can be identified within the encoding of the replaceable-information values. FIG. 12 shows an example of this. As shown in this example, the values again initially identify RRIP values 202, before a cache line corresponding to an address in the read set is first allocated to the set 201—or a tstart instruction is encountered. The encoding of the replaceable-information values is then changed to identify that these values should be identified as read-set information 208, in the same way as in FIG. 7.

In this example, by using the technique of group identifiers 210, 212 and entry indicators 214, 216 described in FIG. 10, two transactions—transaction 1 (T1) and transaction 2 (T2)—can have their read-set information conveyed within the bits freed up by the encoding of the replaceable-information values while still leaving room for error check bits 218. In fact, this example leaves two spare bits 220, in addition to the spare bit 220 already remaining in FIG. 7, i.e. three spare bits 220 in total. In this example, the read-set information for the two transactions share an error code 218, and each transaction's read-set information is represented with four entry indicators 214, 216 and three group identifiers 210, 212, allowing the sixteen ways of a sixteen-way set-associative cache to be represented in just seven bits for each transaction. Again, after the tend instruction 222 is encountered the replaceable-information values are reset all to the value of 10 and they are again interpreted as cache eviction policy information 224.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

We claim:

1. An apparatus comprising:
   processing circuitry to process threads of data processing;
   transactional memory support circuitry to support execution of a transaction within a thread processed by the processing circuitry, the transaction comprising instructions of the thread executed speculatively between a transaction start instruction and a transaction end instruction, for which the processing circuitry is configured to prevent commitment of results of the speculatively executed instructions until the transaction end instruction is reached, in which the transactional memory support circuitry is configured to trigger an abort of the transaction in response to detecting a write access from another thread to one of a read set of addresses tracked for the transaction; and
   a cache having a plurality of entries, each entry associated with one of a plurality of addresses and specifying a replaceable-information value associated with said one of said plurality of addresses, the replaceable-information value comprising cache eviction policy information;
   in which, while the transaction is pending, the transactional memory support circuitry is configured to identify, based on an encoding of the replaceable-information values, read-set information identifying addresses in the read set of addresses tracked for the transaction.

2. The apparatus of claim 1, in which, following the transaction start instruction, the transactional memory support circuitry is configured to set the encoding of the replaceable-information values to identify the read-set information.

3. The apparatus of claim 2, in which the transactional memory support circuitry is configured to:
   outside of the transaction, limit a number of permitted encodings of the replaceable-information values; and
   following the transaction start instruction, set the encoding of the replaceable-information values to a non-permitted encoding to identify the read-set information.

4. The apparatus of claim 3, in which, outside of the transaction, the non-permitted encoding is a redundant encoding providing a functionally equivalent result to another permitted encoding.

5. The apparatus of claim 3, in which there is a Hamming distance of at least 3 between the encoding set following the transaction start instruction and any permitted encoding outside of the transaction.

6. The apparatus of claim 3, in which the non-permitted encoding comprises an encoding in which more than a predetermined number of replaceable-information values in a subset of the replaceable-information values have a predetermined value.

7. The apparatus of claim 1, in which the cache comprises an encoding-indicator field to store an encoding-indicator value to provide an indication to the processing circuitry of the encoding of the replaceable-information values.

8. The apparatus of claim 7, in which, in response to the transaction start instruction, the transactional memory support circuitry is configured to select the encoding of the replaceable-information values to reduce a number of bits used for the cache eviction policy information.

9. The apparatus of claim 1, in which a first portion of the read-set information comprises error detection information for detecting errors in the read-set information.

10. The apparatus of claim 9, in which the transactional memory support circuitry is configured to select, following the transaction start instruction, the encoding of a second portion of the read-set information to identify:
    at least one group indicator associated with a group of entries in the cache, the group identifier being indicative of whether said group of entries is a complete group comprising only entries in the read set or an incomplete group comprising at least one entry that is not in the read set; and
    at least one entry indicator associated with at least one entry in the incomplete group, the entry indicator being indicative of whether the at least one entry is in the read set.

11. The apparatus of claim 1, in which the transactional memory support circuitry is configured to identify, based on the encoding of the replaceable-information values, read-set information for each of a plurality of transactions.

12. The apparatus of claim 11, in which the read-set information for each of the plurality of transactions shares an error detection code.

13. The apparatus of claim 1, in which, in response to execution of the transaction end instruction or an abort of the transaction, the processing circuitry is configured to interpret the replaceable-information values of the plurality of entries as the cache eviction policy information.

14. The apparatus of claim 13, in which, following execution of the transaction end instruction or the abort of the transaction, the transactional memory support circuitry is configured to replace each one of the replaceable-information values of the plurality of entries with a value uncorrelated with said one of the replaceable-information values.

15. The apparatus of claim 1, in which, while the transaction is pending, the processing circuitry is configured to select cache lines for eviction from the cache independently of the replaceable-information values.

16. The apparatus of claim 1, in which, while the transaction is pending, the processing circuitry is configured to select cache lines for eviction from the cache based on an amended cache eviction policy based on amended eviction policy information encoded in the replaceable-information values alongside the read-set information.

17. The apparatus of claim 1, in which, while the transaction is pending, the processing circuitry is configured to preferentially select an entry associated with an address other than the read set of addresses tracked for the transaction, when selecting an entry for eviction from the cache.

18. A data processing method comprising:
identifying, in a cache having a plurality of entries, each entry associated with one of a plurality of addresses, a replaceable-information value for each address, in which the replaceable-information value comprises cache eviction policy information;
while a transaction is pending, identifying, based on an encoding of the replaceable-information values, read-set information identifying addresses in a read set of addresses tracked for the transaction;
in which the transaction comprises instructions of a thread executed speculatively between a transaction start instruction and a transaction end instruction, for which commitment of results of the speculatively executed instructions is prevented until the transaction end instruction is reached, and an abort of the transaction is triggered in response to detection of a write access from another thread to one of the read set of addresses tracked for the transaction.

19. An apparatus comprising:
means for processing threads of data processing;
means for supporting execution of a transaction within a thread processed by the means for processing, the transaction comprising instructions of the thread executed speculatively between a transaction start instruction and a transaction end instruction, for which the means for processing is configured to prevent commitment of results of the speculatively executed instructions until the transaction end instruction is reached, in which the means for supporting is configured to trigger an abort of the transaction in response to detecting a write access from another thread to one of a read set of addresses tracked for the transaction; and
a means for caching data, comprising a plurality of entries, each entry associated with one of a plurality of addresses and specifying a replaceable-information value associated with said one of said plurality of addresses, the replaceable-information value comprising cache eviction policy information;
in which, while the transaction is pending, the means for supporting is configured to identify, based on an encoding of the replaceable-information values, read-set information identifying addresses in the read set of addresses tracked for the transaction.

* * * * *